(12) United States Patent
Yamamura et al.

(10) Patent No.: US 9,521,287 B2
(45) Date of Patent: Dec. 13, 2016

(54) LIGHT GUIDE, ILLUMINATING DEVICE FOR IMAGE READING, AND IMAGE READING APPARATUS

(71) Applicant: Konica Minolta, Inc., Chiyoda-ku, Tokyo (JP)

(72) Inventors: Akira Yamamura, Toyokawa (JP); Masahiko Tanaka, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/597,668

(22) Filed: Jan. 15, 2015

(65) Prior Publication Data

US 2015/0198758 A1   Jul. 16, 2015

(30) Foreign Application Priority Data

Jan. 15, 2014   (JP) ................. 2014-004825

(51) Int. Cl.
*H04N 1/04* (2006.01)
*H04N 1/028* (2006.01)
(Continued)

(52) U.S. Cl.
CPC .......... *H04N 1/02835* (2013.01); *G02B 6/001* (2013.01); *G02B 6/0006* (2013.01); *F21Y 2101/02* (2013.01); *G02B 6/0038* (2013.01)

(58) Field of Classification Search
CPC ...... G02B 6/0006; G02B 6/001; G02B 6/0038
(Continued)

(56) References Cited

U.S. PATENT DOCUMENTS 5,406,462 A * 4/1995 Fallahi ................. F21V 7/09
362/302
5,652,665 A * 7/1997 Chen .................. G03B 27/54
250/228
(Continued)

FOREIGN PATENT DOCUMENTS

JP   H11134918 A   5/1999
JP   2005117602 A   4/2005
(Continued)

OTHER PUBLICATIONS

Japanese Notification of Reasons for Rejection corresponding to Patent Application No: 2014-004825; Dispatch Date: Dec. 15, 2015, with English translation.

*Primary Examiner* — Houshang Safaipour
(74) *Attorney, Agent, or Firm* — Cantor Colburn LLP

(57) ABSTRACT

A light guide for use in an image reading apparatus. The light guide extends in a predetermined direction. The light guide comprises an emitting surface, through which light rays entering the light guide are emitted, and a reflecting surface configured to reflect the light rays to the emitting surface. A cross-sectional surface of the light guide, which is a sectional surface of the light guide along a plane orthogonal to the predetermined direction in which the light guide extends, has a shape including a combination of an ellipse and a parabola. The parabola on the cross-sectional surface of the light guide defines the reflecting surface. A focal point of the parabola is located on a first focal point of the ellipse that is closer to the reflecting surface.

13 Claims, 6 Drawing Sheets

(51) Int. Cl.
*F21V 8/00* (2006.01)
*F21Y 101/02* (2006.01)

(58) Field of Classification Search
USPC ............................... 358/474, 475, 498, 497
See application file for complete search history.

(56) References Cited

U.S. PATENT DOCUMENTS

| | | | |
|---|---|---|---|
| 6,351,594 B1 | 2/2002 | Nakamura et al. | |
| 2003/0214634 A1* | 11/2003 | Akiyama | G02B 27/0927 353/31 |
| 2003/0214635 A1* | 11/2003 | Asakura | G03B 21/00 353/31 |

FOREIGN PATENT DOCUMENTS

| | | |
|---|---|---|
| JP | 2006014081 A | 1/2006 |
| JP | 2007080637 A | 3/2007 |
| JP | 2011044336 A | 3/2011 |
| JP | 2011249020 A | 12/2011 |
| JP | 2013051108 A | 3/2013 |
| WO | 2005001529 A1 | 1/2005 |

* cited by examiner

LIGHT GUIDE, ILLUMINATING DEVICE FOR IMAGE READING, AND IMAGE READING APPARATUS

The present invention claims benefit of priority to Japanese Patent Application No. 2014-004825 filed Jan. 15, 2014, the entire content of which is incorporated herein by reference.

BACKGROUND

1. Technical Field

The present invention relates to a light guide, an illuminating device for image reading, and an image reading apparatus, and more particularly to an image reading apparatus configured to optically read an image of a document, and a light guide and an illuminating device for use in the image reading apparatus.

2. Description of Related Art

In an image reading apparatus called a scanner, generally, either a reading system including an illumination unit extending in a main-scanning direction or an object, such as a document, to be subjected to image reading is moved in a sub-scanning direction, so that the image of the document can be read two-dimensionally. As a light source for the image reading, a fluorescent lamp is conventionally used. In recent years, however, replacement of the fluorescent lamp with an LED is accelerated. Unlike a fluorescent lamp, an LED is a point light source. Therefore, when an LED is used as a light source in an image reading apparatus, normally, a light guide as disclosed by Japanese Patent Laid-Open Publication No. 2013-51108 is also used so as to achieve linear light distribution needed for scanning. Such a light guide 510 (see FIG. 12) reflects light input from the LED on a reflecting surface provided therein and outputs the reflected light toward a predetermined image reading point through an emitting surface. With such a conventional light guide, however, all of the light rays reflected by the reflecting surface are not directed to the predetermined image reading point A, and some of the reflected light rays travel to places far away from the image reading point A as illustrated in FIG. 12. Thus, such a conventional light guide has a low irradiation efficiency.

SUMMARY

An object of the present invention is to provide a light guide, an illuminating device for image reading, and an image reading apparatus having an improved irradiation efficiency.

A light guide according to a first aspect of the present invention is a light guide for use in an image reading apparatus, wherein: the light guide extends in a predetermined direction; the light guide comprises an emitting surface, through which light rays entering the light guide are emitted, and a reflecting surface configured to reflect the light rays to the emitting surface; a cross-sectional surface of the light guide, which is a sectional surface of the light guide along a plane orthogonal to the predetermined direction in which the light guide extends, has a shape including a combination of an ellipse and a parabola; the parabola on the cross-sectional surface of the light guide defines the reflecting surface; and a focal point of the parabola is located on a first focal point of the ellipse that is closer to the reflecting surface.

An illuminating device according to a second aspect of the present invention comprises: the light guide described above; and a light source provided at an end of the light guide, wherein the light source is located such that the light source overlaps with the first focal point when viewed from the predetermined direction in which the light guide extends.

An illuminating device according to a third aspect of the present invention comprises: the light guide described above; and a reflective mirror configured to reflect light rays emitted from the light guide to an image reading point.

An image reading apparatus according to a fourth aspect of the present invention comprises either one of the illuminating devices described above.

An image reading apparatus according to a fifth aspect of the present invention comprises the light guide described above, wherein an image reading point is located on a line passing two focal points of the ellipse on the cross-sectional surface.

An image reading apparatus according to a sixth aspect of the present invention comprises the light guide described above, wherein a document supporting surface is located at a position on which light rays emitted from the light guide through the emitting surface are focused.

DETAILED DESCRIPTION OF THE PREFERRED EMBODIMENTS

A light guide, an illuminating device for image reading and an image reading apparatus according to an embodiment of the present invention will be hereinafter described.

Structure of Image Reading Apparatus; See FIG. 1

Figure 1:
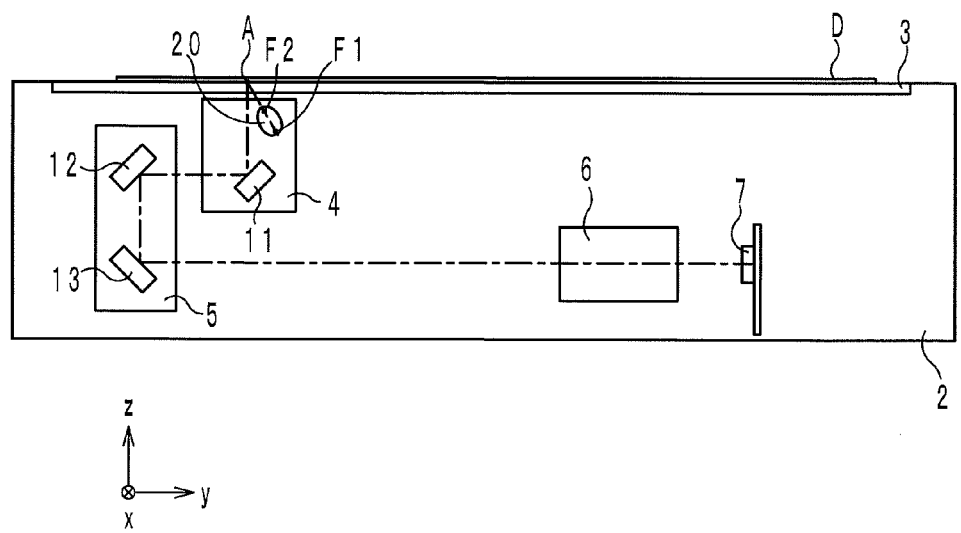
FIG. 1 is a schematic view indicating the internal configuration of an image reading apparatus according to an embodiment of the present invention.

FIG. 1 is a schematic view illustrating the configuration of an image reading apparatus 1 according to an embodiment of the present invention. In the following, the main-scanning direction of the image reading apparatus is referred to as x-direction, and the sub-scanning direction of the image reading apparatus is referred to as y-direction. The vertical direction of the image reading apparatus is referred to as z-direction. The upstream sub-scanning direction is a negative y-direction, and the upstream main-scanning direction is a negative x-direction.

As illustrated in FIG. 1, the image reading apparatus 1 comprises a body 2, a document glass 3, a first slider unit 4, a second slider unit 5, a focusing lens 6, an image pick-up element 7, mirrors 11 through 13, and an illuminating device 20 for image reading.

The body 2 is a cuboidal case supporting the document glass 3, the first slider unit 4, the second slider unit 5, the focusing lens 6, the image pick-up element 7, the mirrors 11 through 13, and the illuminating device 20. The document glass 3 is a rectangular transparent plate fitted in an opening made on the upper surface of the body 2. A document D is placed on a mount surface (i.e., the upper surface) of the document glass 3 with a side to be read down.

The illuminating device 20 illuminates the document D through the document glass 3. The point on which light rays emitted from the illuminating device 20 are focused is on the mount surface of the document glass 3 for supporting the document D.

As seen in FIG. 1, the mirror 11 reflects light reflected from the document D in the negative y-direction. The mirror 12 reflects the light coming from the mirror 11 in the negative z-direction. The mirror 13 reflects the light coming from the mirror 12 in the positive y-direction.

The illuminating device 20 and the mirror 11 are, as seen in FIG. 1, mounted on the first slider unit 4. During image reading of the document D, the first slider unit 4 is moved in the positive y-direction along the lower surface of the document glass 3 at a speed V by a mechanism (not shown), for example, including a motor, a belt, a pulley, etc.

The mirrors 12 and 13 are, as seen in FIG. 1, mounted on the second slider unit 5. During image reading of the document D, the second slider unit 5 is moved in the positive y-direction along the lower surface of the document glass 3 at a speed V/2 by a mechanism (not shown), for example, including a motor, a belt, a pulley, etc. Thereby, the optical path length from the surface of the document D being read to the image pick-up element 7 is kept constant during the movements of the slider units 4 and 5.

The focusing lens 6 focuses light to form optical images on the image pick-up element 7. The image pick-up element 7 is a light-receiving element configured to receive the light reflected from the document D. Specifically, the image pick-up element 7 is a line sensor, such as a CCD camera or the like, having a linear image pick-up area extending in the x-direction, and the image pick-up element 7 receives optical images formed by the focusing lens 6 to scan an image of the document D.

In the image reading apparatus 1 having the structure above, for image reading of the document D, the document D is illuminated by the illuminating device 20, and light reflected from the document D is reflected by the mirrors 11, 12 and 13 sequentially. The light reflected by the mirror 13 enters the focusing lens 6, and the light is focused on the image pick-up element 7 by the focusing lens 6. The image pick-up element 7 carries out photoelectric conversion pixel by pixel based on the light intensity of each pixel. In this way, the image pick-up element 7 generates image signals (RGB signals) corresponding to the image of the document and outputs the signals to a control unit (not shown).

Structure of Illuminating Device; See FIGS. 2 and 3

Figure 2:
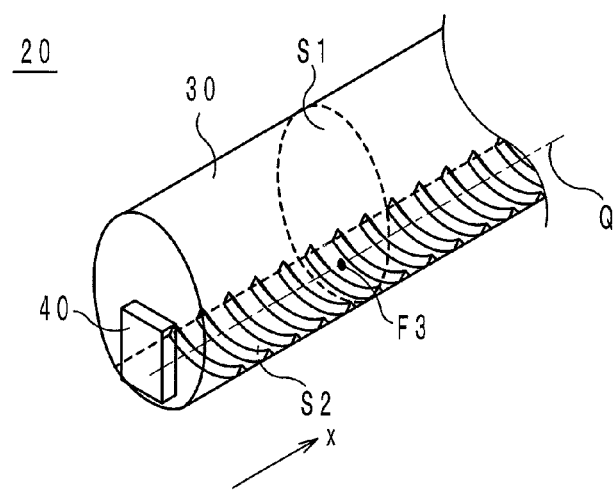
FIG. 2 is a perspective view of an illuminating device for image reading according to an embodiment of the present invention.

As illustrated in FIG. 2, the illuminating device 20 as a whole has a rod-like shape extending in the x-direction. The illuminating device 20 comprises a light guide 30 and an LED light source 40.

Figure 3:
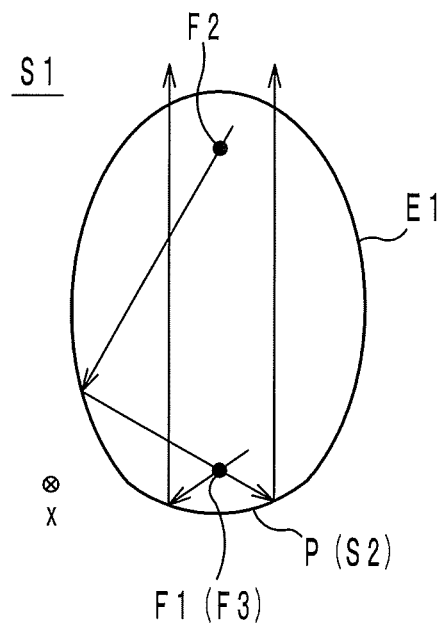
FIG. 3 is a sectional view of a light guide according to an embodiment of the present invention.

The light guide 30 is a rod-like acrylic member extending in the x-direction. As seen in FIG. 3, a cross-sectional surface S1 of the light guide 30, which is a sectional surface of the light guide 30 along a plane orthogonal to the x-direction, has a shape that is a combination of an ellipse E1 and a parabola P. In this embodiment, the parabolic portion P defines a reflecting surface S2 of the light guide 30, and the elliptic portion E1 defines the other part of the light guide 30. On the reflecting surface S2, a prism is provided, and light rays entering the prism are emitted from the light guide 30.

As seen in FIG. 3, on the cross-sectional surface S1, the two focal points F1 and F2 of the ellipse E1 are located on the axis of the parabola P, and as seen in FIG. 1, an image reading point A is located on the extended line of the axis of the parabola P to the positive side in the z-direction. Further, as indicated in FIG. 3, on the cross-sectional surface S1, the focal point F3 of the parabola P is located on the one of the focal points of the ellipse E1 that is closer to the reflecting surface S2 (in the case of FIG. 3, the foal point F1).

The LED light source 40, which is located at the end of the light guide 30 in the negative x-direction as seen in FIG. 2, is a white light source. When viewed from the x-direction, the optical axis Q of the LED light source 40 is located on the focal point F3 of the parabola P on the cross-sectional surface of the light guide 30.

Effects

Figure 12:
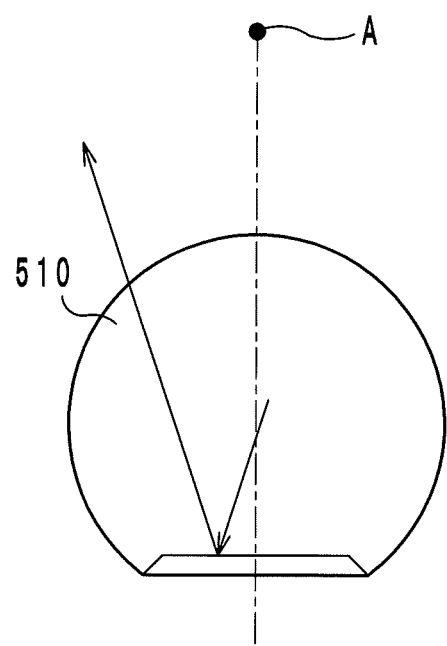
FIG. 12 is a sectional view of a light guide of the same type as the light guide disclosed by Japanese Patent Laid-Open Publication No. 2013-51108.

In the image forming apparatus 1 having the structure above, as illustrated in FIG. 3, light rays that entered the light guide 30 pass the focal point F3 of the parabola P on the cross-sectional surface of the light guide 30 and emit from the light guide 30 in a direction parallel to the axis of the parabola P. In this regard, since the image reading point A is located on the extended line of the axis of the parabola P, the light rays that passed the focal point F3 of the parabola P of the light guide 30 are emitted toward the image reading point A. Thus, the light guide 30 can diminish the risk residing in the conventional light guide 510 illustrated in FIG. 12, that is, the risk that some of light rays entering the light guide are emitted in unintended directions and travel to places far away from the reading point A.

On the cross-sectional surface of the light guide 30, the focal point F1 of the ellipse E1 and the focal point F3 of the parabola P are at the same place. Accordingly, light rays that passed the other focal point F2 of the ellipse E1, which is not at the same place as the focal point F3 of the parabola P, are total-reflected and pass the focal point F1 that is at the same place as the focal point F3 of the parabola P, and the light rays are emitted in a direction parallel to the axis of the parabola P. Thus, also the light rays passing the focal point F2 of the ellipse E1 in the light guide 30 are emitted in a direction parallel to the axis of the parabola P and travel toward the image reading point A. Therefore, with the light guide 30, a higher irradiation efficiency can be achieved compared with conventional light guides.

In the illuminating device 20 of the image reading apparatus 1, the LED light source 40 is located to overlap the focal point F3 of the parabola P when viewed from the x-direction. Accordingly, light rays emitted from the LED light source 40 have a tendency to pass the focal point F3 of the parabola P. Consequently, many of the light rays emitted from the LED light source 40 are directed to the image reading point A, and the illuminating device 20 can achieve a higher irradiation efficiency.

Figure 4:
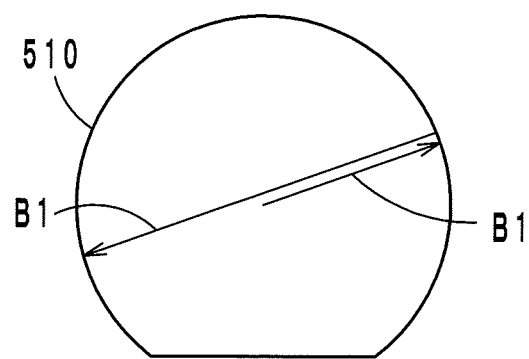
FIG. 4 is a sectional view of a conventional light guide.

In the conventional light guide 510 having a circular cross-sectional shape, as illustrated in FIG. 4, a light ray B1 coming from a light source in a direction not toward the reflecting surface is total-reflected repeatedly to reciprocate between the same two points on the circle of a cross-sectional surface. In this case, the light ray B1 passes through the light guide 510 without being reflected by the reflecting surface. Thus, with the conventional light guide 510 having a circular cross-sectional shape, such light rays B1 coming thereto in directions not toward the reflecting surface are not directed to the image reading point at all. The light guide 30, on the other hand, has an elliptic portion. Accordingly, a light ray B1 coming from a light source to the light guide 30 in a direction not toward the reflecting surface S2 is total-reflected repeatedly while being reflected on various points. Therefore, there is no risk that none of such light rays B1 are emitted from the light guide 30 while passing through the light guide 30, and some of the light rays B1 reach the light reflecting surface S2 and are emitted from the light guide 30 toward the image reading point. Thus, in the image reading apparatus 1, the light guide 30 can achieve a higher irradiation efficiency than the conventional light guide 510 having a circular cross-sectional shape.

In order to prove the advantageous effects of the light guide 30 of the image reading apparatus 1, the inventors conducted an experiment. For the experiment, the following samples were used. A sample of the light guide 30 of the image reading apparatus 1 was used as a first sample T. A sample of a light guide having a circular cross-sectional shape was used as a second sample U. A sample of a light guide having a triangular cross-sectional shape was used as a third sample V. A sample of a light guide having a quadrangular cross-sectional shape was used as a fourth sample W. In the experiment, light of 1 watt was caused to enter each of the samples, and it was measured what watts of light was irradiated from each of the samples to the image reading point.

Figure 5:
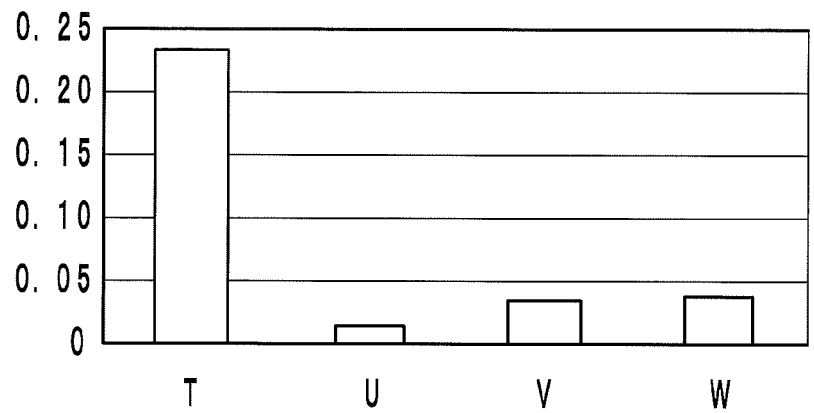
FIG. 5 is a graph indicating the irradiation efficiency of the light guide according to the embodiment and the irradiation efficiencies of light guides according to comparative examples.

FIG. 5 indicates the results. By the sample T, the image reading point was irradiated with light of 0.23 watts. By the sample U, the image reading point was irradiated with light of 0.02 watts. By the sample V, the image reading point was irradiated with light of 0.03 watts. By the sample W, the image reading point was irradiated with light of 0.04 watts. These results show that the light guide 30 of the image reading apparatus 1 can achieve a high irradiation efficiency.

First Modification; See FIG. 6

Figure 6:
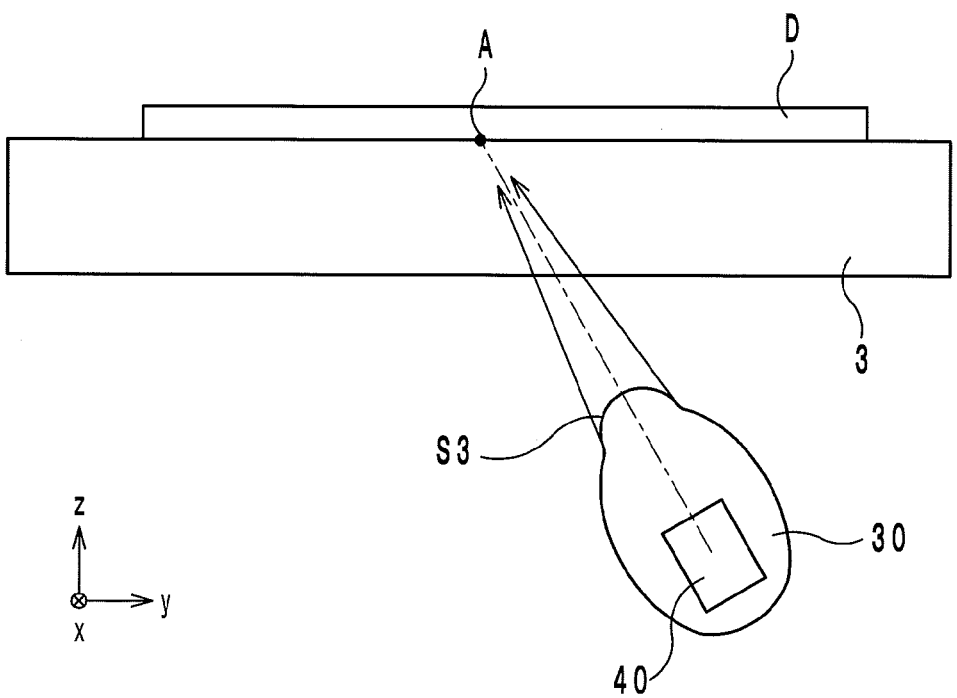
FIG. 6 is a schematic view indicating the vicinity of an image reading point in an image reading apparatus according to a modification.

An image reading apparatus 1A according to a first modification is different from the image reading apparatus 1 in the following point. In the image reading apparatus 1A, the light guide 30 has a light-emitting surface S3 that is not elliptic on a cross-sectional surface S1. Specifically, as illustrated in FIG. 6, the light-emitting surface S3 has a shape stretched in the light emitting direction. By forming the light-emitting surface S3 into a non-elliptic shape, it becomes easy to vary the position on which light rays emitted through the light-emitting surface S3 are focused. Consequently, the image reading apparatus 1 can readily respond to changes in the distance between the light guide and the image reading point A.

There is no other structural difference between the image reading apparatus 1A and the image reading apparatus 1. Therefore, the image reading apparatus 1A is as described above in connection with the image reading apparatus 1 except for the point that the light-emitting surface S3 of the light guide 30 is not elliptic on the cross-sectional surface S1 of the light guide 30.

Second Modification; See FIGS. 7 and 8

Figure 7:
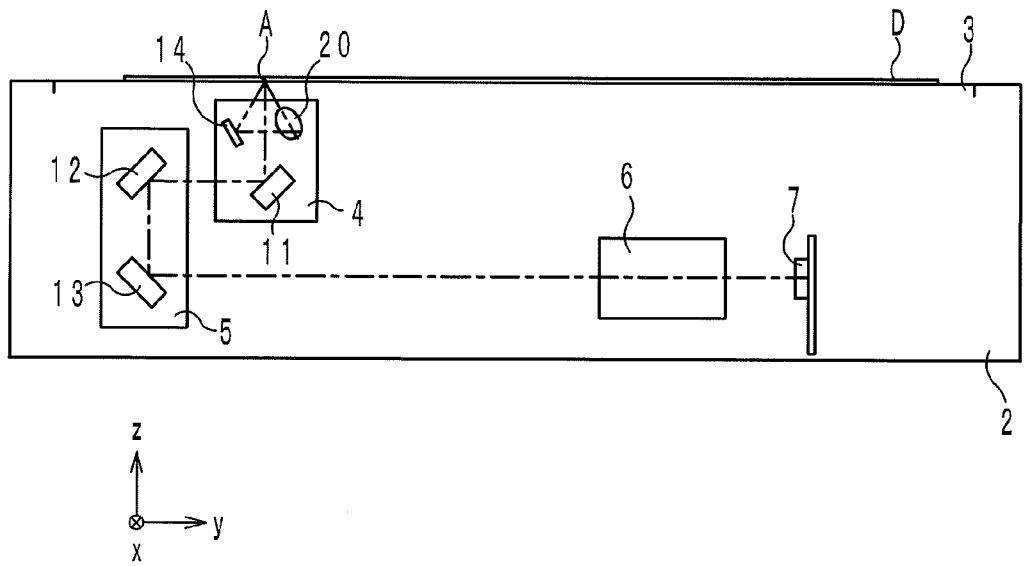
FIG. 7 is a schematic view indicating the internal configuration of the image reading apparatus according to the modification.
Figure 8:
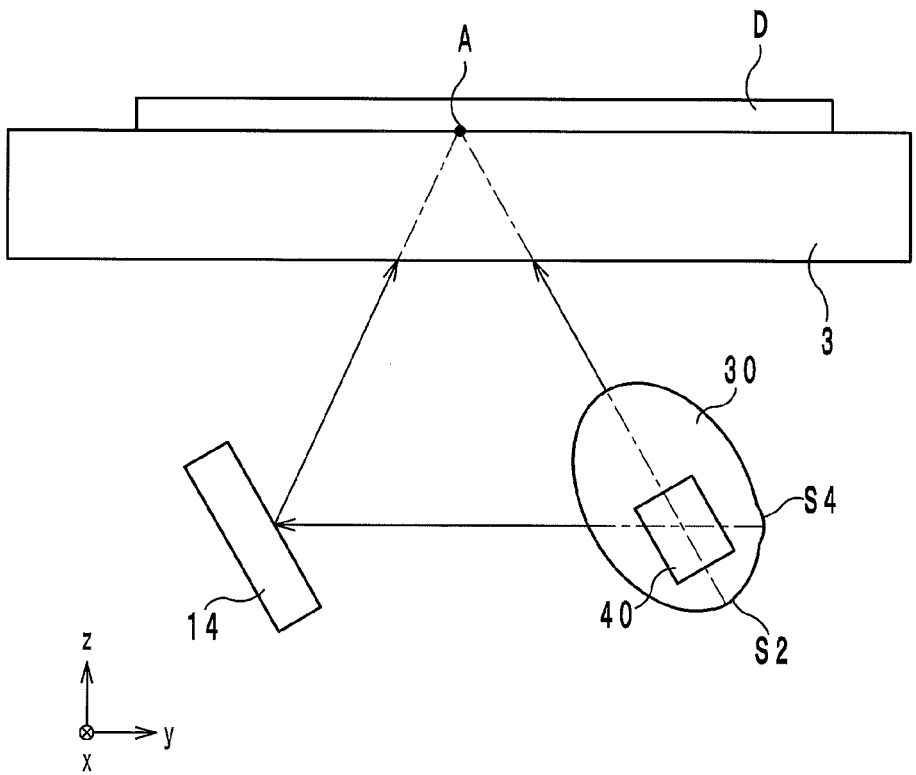
FIG. 8 is a schematic view indicating the vicinity of an image reading point in an image reading apparatus according to another modification.

An image reading apparatus 1B according to a second modification is different from the image reading apparatus 1 in the following points. The image reading apparatus 1B further comprises a mirror 14 (reflective plate), and in accordance with the provision of the mirror 14, the shape of a part of the light guide 30 is changed. Specifically, as illustrated in FIG. 7, in the image reading apparatus 1B, the mirror 14 is arranged along the light guide 30 to extend in the x-direction. Further, as illustrated in FIG. 8, the light guide 30 in the image reading apparatus 1B has a reflecting surface S4 configured to direct light rays to the mirror 14 in addition to the reflecting surface S2 configured to direct light rays to the image reading point A.

In the image reading apparatus 1B having the structure above, there occur light rays emitted from the light guide 30 to travel directly to the image reading point A and light rays emitted from the light guide 30 to travel to the image reading point A via the mirror 14. Thus, in the image reading apparatus 1B, a document is irradiated with light from two directions, which prevents occurrence of a shadowed portion at the image reading point A.

There is no other structural difference between the image reading apparatus 1B and the image reading apparatus 1. Therefore, the image reading apparatus 1B is as described above in connection with the image reading apparatus 1 except for the points that the image reading apparatus 1B further comprises a mirror 14 (reflective plate) and that in accordance with the provision of the mirror 14, the shape of a part of the light guide 30 is changed.

Third Modification; See FIGS. 9 and 10

Figure 9:
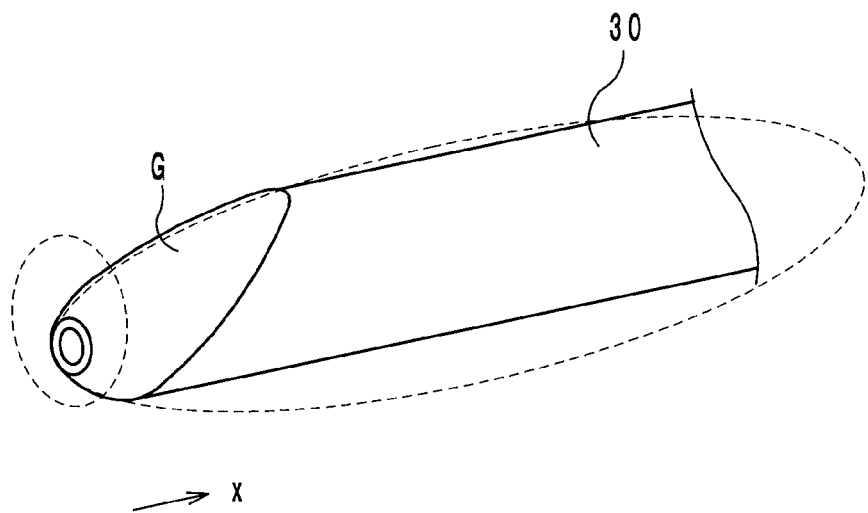
FIG. 9 is a perspective view of a light guide according to a modification.
Figure 10:
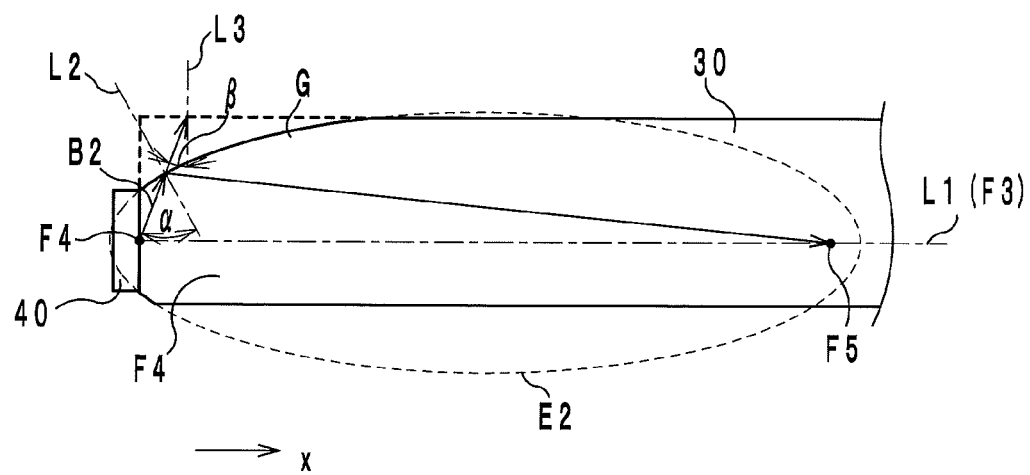
FIG. 10 is a side view of an illuminating device according to another modification, viewed from a direction orthogonal to a direction in which the light guide extends.

An image reading apparatus 1C according to a third modification is different from the image reading apparatus 1 in the shape of an end portion of the light guide 30 and in the position of the LED light source 40. Specifically, as illustrated in FIG. 9, in the light reading apparatus 1C, the end portion G in the negative x-direction of the light guide 30 is tapered. When viewed from a direction orthogonal to the x-direction, as illustrated in FIG. 10, the end portion G is in the shape of a part of an ellipse E2. The line L1 connecting the two focal points F4 and F5 of the ellipse E2 is at the same place as the focal point F3 of the parabola P on a cross-sectional surface of the light guide 30. On the focal point F4 of the ellipse E2 that is farther in the negative x-direction, the LED light source 40 is located.

In the image reading apparatus 1C having the structure above, light rays emitted from the LED light source 40 are prevented from failing to be total-reflected and leaking to the outside of the light guide 30 from the end portion G. More specifically, as indicated in FIG. 10, the angle of incidence $\alpha$ between a light ray B2 emitted from the LED light source 40 and incident on the elliptic inner surface of the end portion G and a line L2 orthogonal to the surface at the point of incidence is greater than the angle of incidence $\beta$ between the light ray B2 and a line L3 orthogonal to the inner surface of the end portion G of the light guide 30 if the end portion G is not tapered. Thus, by tapering the end portion G of the light guide 30, the angle of incidence of the light ray B2 on the inner surface of the end portion G becomes greater and accordingly becomes more likely to be beyond the critical angle. Consequently, such a light ray is more likely to be total-reflected and can be prevented from leaking to the outside of the light guide 30 from the end portion G.

In the light guide 30 of the image reading apparatus 1C, the surface of the end portion G is in the shape of a part of an ellipse E2, and the line L1 connecting the two focal points of the ellipse E2 is at the same place as the focal point F3 of the parabola P on the cross-sectional surface of the light guide 30. Further, the LED light source 40 is located on the focal point F4 of the ellipse E2 that is located farther in the negative x-direction. In this structure, after being total-reflected by the end portion G, the light ray B2 passes the focal point F5 of the ellipse E2 that is located farther in the positive x-direction and enters the reflecting surface. Then, the light ray B2 is emitted toward the image reading point A. Thus, in the image reading apparatus 1C, the light guide 30 can direct light rays total-reflected by the end portion G to the image reading point A. Consequently, the image reading apparatus 1C can achieve a higher irradiation efficiency than the image reading apparatus 1.

There is no other structural difference between the image reading apparatus 1C and the image reading apparatus 1. Therefore, the image reading apparatus 1C is as described above in connection with the image reading apparatus 1 except for the shape of the end portion of the light guide 30 and the position of the LED light source 40.

Other Embodiments; See FIG. 11

Figure 11:
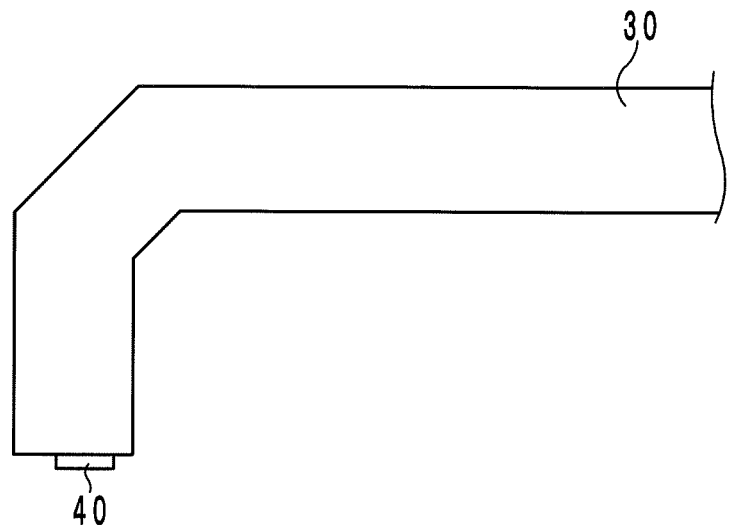
FIG. 11 is a side view of an illuminating device according to another embodiment of the present invention.

Light guides, illuminating devices for image reading, and image reading apparatuses according to the present invention are not limited to the embodiment and the modifications above. For example, the reflecting surface of the light guide 30 is not necessarily a prism and may be a surface coated with a white paint. Also, as illustrated in FIG. 11, the light guide 30 may be L-shaped.

Although the present invention has been described in connection with the preferred embodiments above, it is to be noted that various changes and modifications may be apparent to those who are skilled in the art. Such changes and modifications are to be understood as being within the scope of the invention.

What is claimed is:

1. An image reading apparatus comprising:
    a light guide comprising:
        an emitting surface, through which light rays entering the light guide are emitted;
        a reflecting surface configured to reflect the light rays to the emitting surface;
        a cross-sectional surface of the light guide, which is a sectional surface of the light guide along a plane orthogonal to a predetermined direction in which the light guide extends, the cross-sectional surface having a shape comprising a combination of an ellipse and a parabola that is convex outward with respect to the light guide;
        wherein the parabola on the cross-sectional surface of the light guide defines the reflecting surface; and
        a focal point of the parabola is located in the light guide, on a first focal point of the ellipse that is closer to the reflecting surface
    wherein an image reading point is located on a line passing two focal points of the ellipse on the cross-sectional surface.

2. The light guide according to claim 1, wherein the emitting surface of the light guide has a non-elliptic shape on the cross-sectional surface.

3. The light guide according to claim 1, comprising a tapered end portion near an entrance surface through which the light rays enter the light guide.

4. The light guide according to claim 3, wherein the tapered end portion is in such a shape that an angle of incidence of a light ray to the thin end portion is greater than a critical angle.

5. An illuminating device for image reading, the illuminating device comprising:
    the light guide according to claim 1, and
    a light source provided at an end of the light guide,
    wherein the light source is located such that the light source overlaps with the first focal point when viewed from the predetermined direction in which the light guide extends.

6. An image reading apparatus comprising: the illuminating device according to claim 5.

7. An illuminating device for image reading, the illuminating device comprising:
    the light guide according to claim 1; and
    a reflective mirror configured to reflect light rays emitted from the light guide to an image reading point.

8. An image reading apparatus comprising:
    the light guide according to claim 1,
    wherein a document supporting surface is located at a position on which light rays emitted from the light guide through the emitting surface are focused.

9. A light guide for use in an image reading apparatus, the light guide comprising:
    an emitting surface, through which light rays entering the light guide are emitted;
    a reflecting surface configured to reflect the light rays to the emitting surface;
    a cross-sectional surface of the light guide, which is a sectional surface of the light guide along a plane orthogonal to a predetermined direction in which the light guide extends, the cross-sectional surface having a shape comprising a combination of an ellipse and a parabola that is convex outward with respect to the light guide; and
    a tapered end portion near an entrance surface through which the light rays enter the light guide
    wherein the parabola on the cross-sectional surface of the light guide defines the reflecting surface;
    a focal point of the parabola is located in the light guide, on a first focal point of the ellipse that is closer to the reflecting surface; and
    the tapered end portion is in such a shape that an angle of incidence of a light ray to the thin end portion is greater than a critical angle.

10. An illuminating device for image reading, the illuminating device comprising:
    the light guide according to claim 9, and
    a light source provided at an end of the light guide,
    wherein the light source is located such that the light source overlaps with the first focal point when viewed from the predetermined direction in which the light guide extends.

11. An illuminating device for image reading, the illuminating device comprising:
    the light guide according to claim 9; and a reflective mirror configured to reflect light rays emitted from the light guide to an image reading point.

12. An image reading apparatus comprising: the illuminating device according to claim 11.

13. An image reading apparatus comprising:
the light guide according to claim 9,
wherein a document supporting surface is located at a position on which light rays emitted from the light guide through the emitting surface are focused.

* * * * *